(12) United States Patent
Luke et al.

(10) Patent No.: US 7,197,087 B2
(45) Date of Patent: Mar. 27, 2007

(54) SYSTEM AND METHOD FOR DIFFERENTIAL IQ DELAY COMPENSATION IN A COMMUNICATIONS SYSTEM UTILIZING ADAPTIVE AQM COMPENSATION

(75) Inventors: Christian G. Luke, Bristol (GB); Ian Johnson, Bristol (GB); Steven Andrew Wood, Bristol (GB)

(73) Assignee: Powerwave Technologies, Inc., Santa Ana, CA (US)

( * ) Notice: Subject to any disclaimer, the term of this patent is extended or adjusted under 35 U.S.C. 154(b) by 0 days.

(21) Appl. No.: 11/175,508

(22) Filed: Jul. 6, 2005

(65) Prior Publication Data

US 2006/0008030 A1    Jan. 12, 2006

Related U.S. Application Data

(60) Provisional application No. 60/586,907, filed on Jul. 9, 2004.

(51) Int. Cl.
*H04L 27/20* (2006.01)
*H04L 25/49* (2006.01)

(52) U.S. Cl. ................. 375/308; 375/297; 332/103; 455/114.3

(58) Field of Classification Search ............ 375/254, 375/283–285, 296, 297, 308; 330/149; 381/94, 381/1, 94.3, 94.4, 94.9; 455/501, 63.1, 67.13, 455/114.2, 114.3; 332/103, 123, 124, 159
See application file for complete search history.

(56) References Cited

U.S. PATENT DOCUMENTS

| | | | |
|---|---|---|---|
| 4,163,944 A | 8/1979 | Chambers et al. ........... 325/446 |
| 6,313,703 B1 * | 11/2001 | Wright et al. ................ 330/149 |
| 6,654,426 B2 | 11/2003 | Lagerblom et al. ......... 375/296 |
| 6,670,900 B1 | 12/2003 | Zhang .......................... 341/118 |
| 6,700,453 B2 | 3/2004 | Heiskala et al. ............. 332/103 |
| 6,714,597 B1 * | 3/2004 | Antonio et al. .............. 375/296 |
| 6,714,601 B2 | 3/2004 | Makinen ...................... 375/316 |
| 6,720,839 B1 | 4/2004 | Torre et al. .................. 332/103 |
| 6,864,745 B2 * | 3/2005 | Ode et al. .................... 330/149 |
| 2001/0005402 A1 * | 6/2001 | Nagatani et al. ............ 375/296 |
| 2002/0058486 A1 * | 5/2002 | Persson .................... 455/150.1 |
| 2002/0181611 A1 * | 12/2002 | Kim ............................ 375/296 |
| 2003/0058960 A1 * | 3/2003 | Lee ............................. 375/297 |
| 2005/0101254 A1 * | 5/2005 | Sasaki et al. ............... 455/63.1 |

* cited by examiner

*Primary Examiner*—Young T. Tse
(74) *Attorney, Agent, or Firm*—Myers Dawes Andras LLP

(57) ABSTRACT

A system and method for compensating for the time delay between the in-phase I and the quadrature Q paths of a digitally modulated transmitter incorporating an analog quadrature modulator is disclosed. The time delay between the in-phase I and the quadrature Q paths is computed and used to calibrate a set of interpolation filters in the forward path that compensate for this delay, reducing the frequency dependent degradation in performance of the analog quadrature modulator. The disclosed system and method provides improved compensation of gain, phase and DC offsets in the analog quadrature modulator over a broader bandwidth. Fractional delay interpolation filters may be used to estimate the delay between the in-phase and quadrature paths. This eliminates the need for a factory calibration procedure, speeding up manufacture and reducing costs.

16 Claims, 4 Drawing Sheets

_US 7,197,087 B2_

SYSTEM AND METHOD FOR DIFFERENTIAL IQ DELAY COMPENSATION IN A COMMUNICATIONS SYSTEM UTILIZING ADAPTIVE AQM COMPENSATION

RELATED APPLICATION INFORMATION

The present application claims priority under 35 USC 119 (e) to provisional application Ser. No. 60/586,907 filed Jul. 9, 2004, the disclosure of which is incorporated herein by reference in its entirety.

FIELD OF THE INVENTION

This invention relates to the field of digital communications, specifically radio transmitters incorporating quadrature modulation for single side-band transmission.

BACKGROUND OF THE INVENTION

In the RF transmission of digital information, digital data is mapped to symbols to be modulated onto a quadrature carrier. The quadrature modulator can be applied in the digital domain, producing a real IF digital signal, or it can be applied in the analog domain. As a digital quadrature modulator is perfect, the result is a single side band, suppressed carrier analog signal. An analog quadrature modulator (AQM) is not perfect; gain, phase and DC imbalances between the two baseband signal paths cause image and Local Oscillator (LO) frequency components to leak through onto the resultant analog modulated signal.

The modulated analog signal is either converted directly to the desired RF operating frequency, or through multiple conversion stages. The RF signal is then amplified to the desired output power with a power amplifier. Power amplifiers exhibit strong non-linearity, which, for variable amplitude modulation schemes, such as WCDMA, result in considerable spectral leakage into neighboring frequency bands. As this leakage is strictly regulated by government agencies, it must be minimized by either operating the power amplifier in a more linear region, which impacts the transmitter efficiency, or by employing a linearization scheme, such as feed-forward or digital predistortion.

Many systems employing digital predistortion linearization schemes require large bandwidths to accommodate the compensation signal. Existing digital to analog converter (DAC) technology prevents the use of digital quadrature modulators for wide bandwidth systems, as the maximum bandwidth achievable is limited to FDAC/2 Hz. An analog baseband system utilizing an analog quadrature modulator, however, has effectively double the bandwidth capability.

In multi-carrier transmission systems, the complex baseband signal can have multiple frequency-offset carriers. If these carriers are symmetrical about 0 Hz, the images created from imperfections in the analog quadrature modulator are hidden under the opposite carrier. However, to aid the design of the transmitter, many systems are able to position the baseband carriers at arbitrary offset frequencies. In this situation the images are visible and can, if not minimized, break the spectral emission requirements.

The quality of the image side band suppression is dependent on the quality of the gain and phase balance between the in-phase and quadrature paths, manifested either on the input signal paths of the modulator or in the internal local oscillator. Additionally, any relative DC offset between the in-phase and quadrature paths degrades the carrier suppression.

Accordingly a need presently exists for a system and method for compensation for gain and phase imbalances which is applied to the in-phase and quadrature paths prior to the analog quadrature modulator of a communications system.

SUMMARY OF THE INVENTION

In a first aspect the present invention provides a method for compensating for the relative time delay between the in-phase and quadrature signal paths of a communications system utilizing an analog quadrature modulator. The method comprises digitally computing the timing errors for the in-phase and quadrature signal paths and adjusting one or both of the in-phase and quadrature signal paths to remove the relative time delay between the in-phase and quadrature signal paths.

In a preferred embodiment of the method, digitally computing the timing errors for the in-phase and quadrature signal paths comprises computing the timing errors from a forward path signal and an observation signal. More specifically, the timing error for the in-phase signal path is computed from the difference between the cross-correlation of the in-phase forward path signal with a delayed in-phase part of the observation signal and the cross-correlation of the in-phase forward path signal with an advanced in-phase part of the observation signal. The timing error for the quadrature signal path is computed from the difference between the cross-correlation of the quadrature part of the forward path signal with a delayed quadrature part of the observation signal and the cross-correlation of the quadrature part of the forward path signal with an advanced quadrature part of the observation signal. Adjusting one or both of the in-phase and quadrature signal paths to remove the relative time delay preferably comprises modifying the coefficients of interpolating filters in the forward path. The method may further comprise accumulating the in-phase timing error and/or quadrature timing error and adjusting one or both of the in-phase and quadrature signal paths to compensate for the relative time delay may comprise using the accumulated in-phase and quadrature timing error to modify the coefficients of interpolating filters on the in-phase and quadrature forward paths.

According to another aspect the present invention provides a method for compensating for the relative time delay between the in-phase and quadrature signal paths of a digitally modulated transmitter. The method comprises receiving in-phase and quadrature digital signals from a forward path and an observation path of the transmitter, digitally computing an in-phase timing error employing a cross-correlation between the observation path and forward path in-phase digital signals, digitally computing a quadrature timing error employing a cross-correlation between the observation path and forward path quadrature digital signals, and determining the absolute difference between the in-phase and quadrature timing errors. The method further comprises correcting the relative time delay between the in-phase and quadrature signals in the forward signal path employing the in-phase timing error and quadrature timing error, and employing the absolute difference between the in-phase and quadrature timing errors to modify the loop gain of the timing error correction in the forward signal path.

In a preferred embodiment of the method, correcting the relative time delay between the in-phase and quadrature signals in the forward signal path comprises modifying the coefficients of interpolating filters in the forward signal path employing coefficients calculated from the in-phase and quadrature timing errors. The interpolating filters preferably introduce fractional delays in the in-phase and quadrature forward paths. For example the coefficient values of the interpolating filter may be computed by a time offset sinc function. Preferably the relative time delay between the in-phase and quadrature signals is divided equally between the in-phase and quadrature forward signal paths in correcting the timing error. Computing the cross-correlations preferably comprises computing the cross-correlation of the in-phase and quadrature forward path signals with advanced and delayed in-phase and quadrature observation path signals. The method may further comprise interpolating the observation path signals prior to the cross-correlation calculations.

According to another aspect the present invention provides a system for compensating for the relative time delay between the in-phase and quadrature signal paths of a communications system. The system comprises a forward path input for receiving digital in-phase and quadrature forward path signals and in-phase and quadrature interpolation circuits coupled to the forward path input and receiving and time adjusting the in-phase and quadrature forward path signals, respectively, employing interpolating coefficients. The system further comprises an adaptation circuit block coupled to the forward path input and receiving the in-phase and quadrature path signals and also having an observation path input for receiving in-phase and quadrature digital observation signals corresponding to the sampled output of the communications system. The adaptation circuit block receives the in-phase and quadrature forward path and observation signals and computes the interpolating coefficients from the in-phase and quadrature forward path and observation signals and provides the interpolating coefficients to the in-phase and quadrature interpolation circuits.

In a preferred embodiment of the system, the in-phase and quadrature interpolation circuits comprise finite impulse response filters and the interpolation coefficients comprise filter coefficients. The finite impulse response filters preferably introduce equal and opposite fractional time delays in the in-phase and quadrature forward paths. The adaptation circuit block preferably comprises an in-phase cross-correlation calculation circuit block receiving the in-phase forward path and observation signals and performing cross-correlation calculations thereon, a quadrature cross-correlation calculation circuit receiving the quadrature forward path and observation signals and performing cross-correlation calculations thereon, and a coefficient computation circuit block coupled to receive the output of the in-phase and quadrature correlation calculation circuit blocks. The adaptation circuit block may further comprise in-phase and quadrature fractional interpolating filters coupled between the observation path input and the in-phase and quadrature cross-correlation calculation circuit blocks. In one embodiment the adaptation circuit block may comprise in-phase and quadrature delay locked loops driven by the error in cross-correlations between the in-phase and quadrature observation signals and forward path signals.

Further features and advantages of the present invention are set out in the following detailed description.

DETAILED DESCRIPTION OF THE INVENTION

The present invention provides a system and method for differential IQ delay compensation in a communications system employing an Analog Quadrature Modulator (AQM) and AQM compensation. The AQM compensation corrects AQM related gain and phase imbalances and is applied to the in-phase and quadrature paths prior to the analog quadrature modulator of a communications system.

Figure 6:
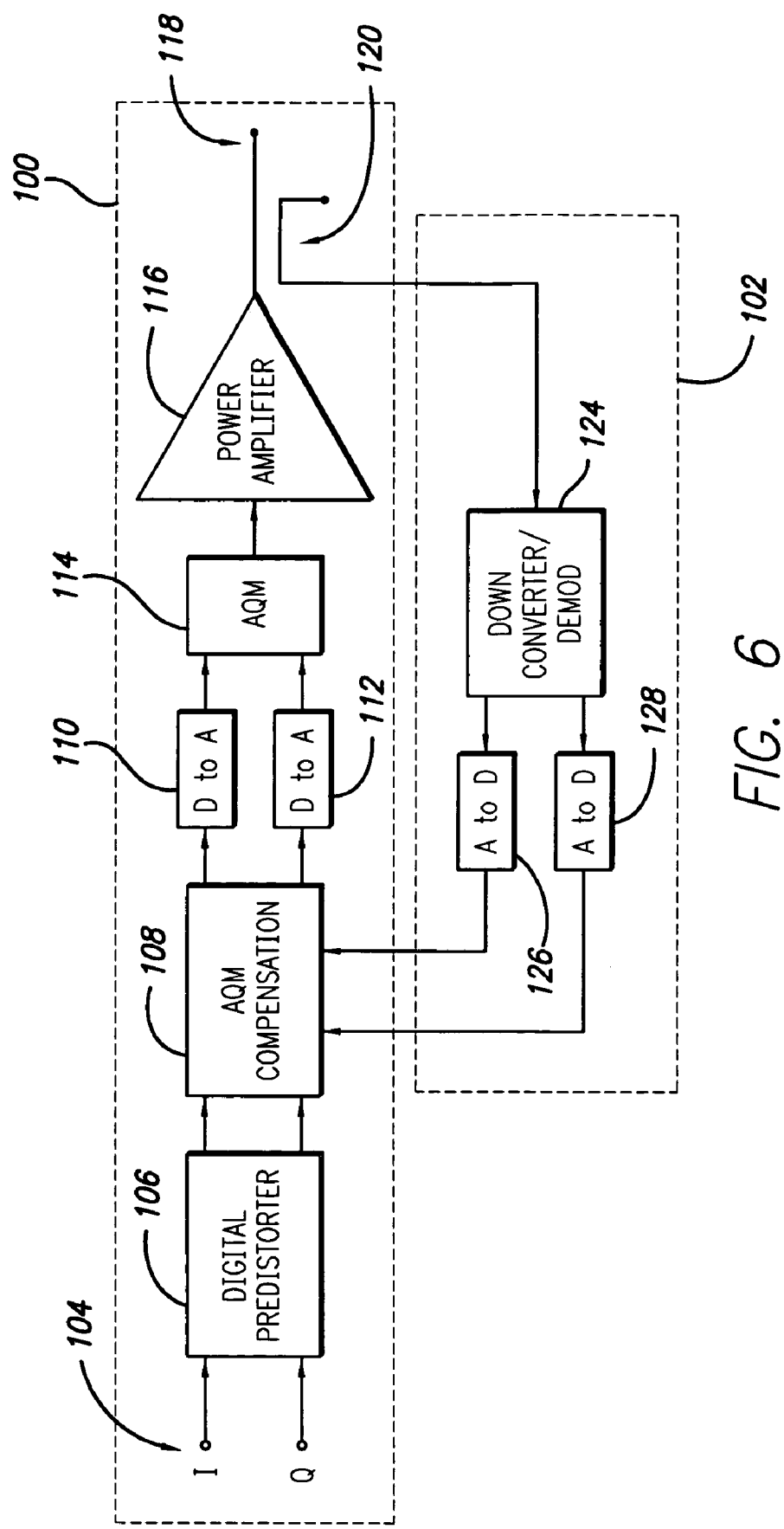
FIG. 6 is a block schematic drawing of a communications system employing an Analog Quadrature Modulator (AQM) and AQM compensation.

FIG. 6 is a block schematic drawing of a communications system employing an Analog Quadrature Modulator (AQM) and AQM compensation. The communications system illustrated is a digitally modulated wireless transmitter and comprises a forward path 100 and an observation path 102. The forward path 100 includes an input 104 receiving a modulated digital I, Q input signal. The input signal may be a wide bandwidth RF cellular communications signal such as, for example, a WCDMA signal. The input signal is provided to a digital predistorter 106 which compensates for distortion introduced by nonlinear components in the transmitter. The output of digital predistorter 106 is provided to AQM compensation circuit block 108 which provides adaptive compensation for gain and phase imbalances introduced by AQM 114 as described in detail below. The output of AQM compensation block 108 is provided to digital to analog (D to A) converters 110, 112 which provide analog I, Q signals to the AQM 114. The AQM 114 may include circuitry for up conversion to the RF carrier frequency or additional conventional up conversion circuit blocks may be employed. The modulated RF signal is provided to power amplifier 116 which provides an amplified RF output signal to output 118 which is coupled to a suitable antenna for wireless transmission of the RF output signal in a cellular communications application. Additional conventional circuit components, such as additional gain stages, filters, and couplers, may be provided in the forward path 100 as is well known to those skilled in the art. The observation path 102 receives an analog sampled RF output signal from sampling coupler 120 and down converts and demodulates the RF signal via conventional circuitry 124. The sampled analog I, Q signal from circuit block 124 is converted to I, Q digital signals by A to D converters 126, 128 which provide these as I, Q digital observation signals to AQM compensation block 108. If the digital predistorter 106 is adaptive, these observation path I, Q signals are also provided to predistorter 106. In such an implementation an absolute time alignment of the observation and forward path signals will be needed for accurate adaptation of the predistorter 106 and such time aligned signals may be provided to AQM compensation block 108 in place of the signals provided from A to D circuits 126, 128. For example, a cross-correlation absolute time alignment of the forward path and observation path signals may be employed, as described in U.S. provisional application Ser. No. 60/586,906 filed Jul. 9, 2004, the disclosure of which is incorporated herein by reference. Additional observation path circuitry may be provided, such as suitable buffers, averaging circuit blocks, and other implementation specific circuits, as known to those skilled in the art.

Figure 1:
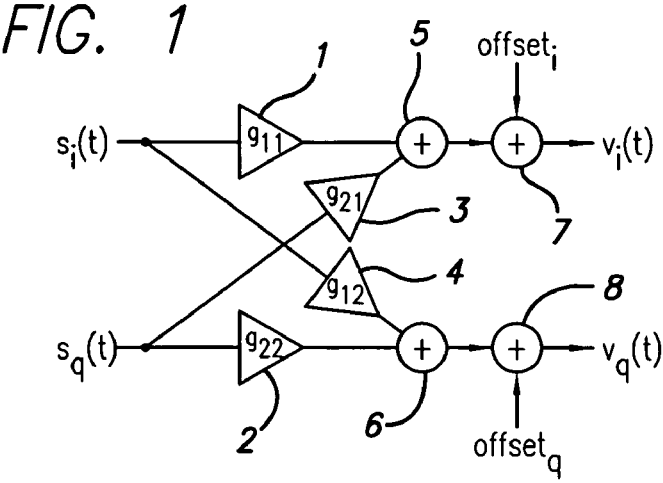
FIG. 1 is a schematic drawing of a preferred circuit for implementing AQM compensation in a communications system.
Figure 4:
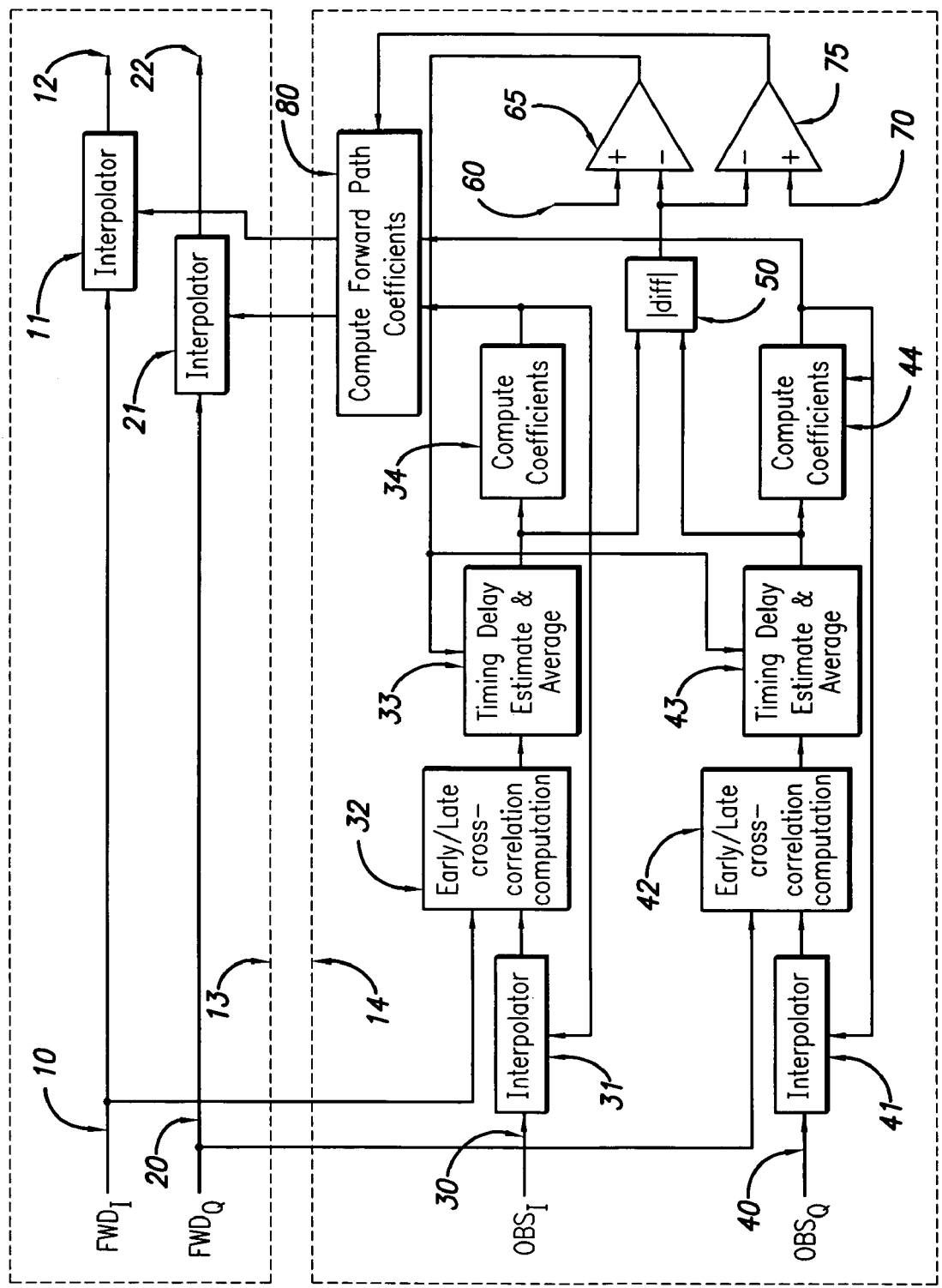
FIG. 4 is a schematic drawing of a circuit for implementing differential IQ delay compensation in a communications system employing AQM compensation, in accordance with a first embodiment of the present invention.

A preferred approach of implementing the AQM compensation block 108 is shown in FIG. 1 and FIG. 4. The circuit of FIG. 1 is capable of applying opposite gain, phase and DC offsets to the in-phase and quadrature paths than those exhibited in the analog quadrature modulator. More specifically gain circuits 1, 2, 3 and 4 and, combiners 5 and 6 correct gain and phase errors and addition circuits 7 and 8 receive DC offset corrections.

The compensation circuit shown in FIG. 1 relies on the quadrature modulation degradation to be frequency independent. If a frequency dependency exists, the circuit can only be optimized for a specific frequency, degrading the efficacy of this technique for wide signal bandwidths. A mechanism for providing frequency dependent quadrature error in the transmitter is the difference in group-delay between the in-phase and quadrature signal paths. The circuit of FIG. 4 compensates for this group delay error and improves the effectiveness of the AQM compensation.

Figure 2:
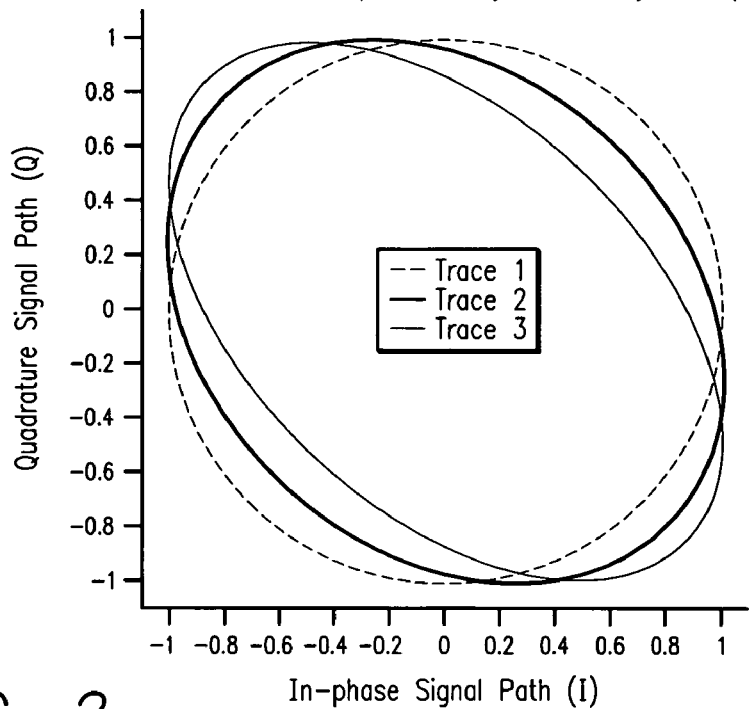
FIG. 2 is a graphical representation of the effect of a relative signal path delay on the quadrature error of a rotating phasor.

FIG. 2 shows the effect of a relative signal path delay on the quadrature error of a rotating phasor. Trace 1 shows the phasor with no delay, giving no quadrature error and a perfect circular locus. Trace 2 shows the locus of the same phasor with an arbitrary time delay introduced in the quadrature signal path. The locus is skewed in gain and phase. However, for this specific frequency, a gain and phase offset can be applied to the compensation circuit to correct for the quadrature error, returning the locus to the circle of trace 1. Trace 3 shows the locus of a rotating phasor at twice the frequency of that shown in trace 2, but with the same time delay. It can be seen that a different gain and phase offset is required to correct for this quadrature error.

Figure 3:
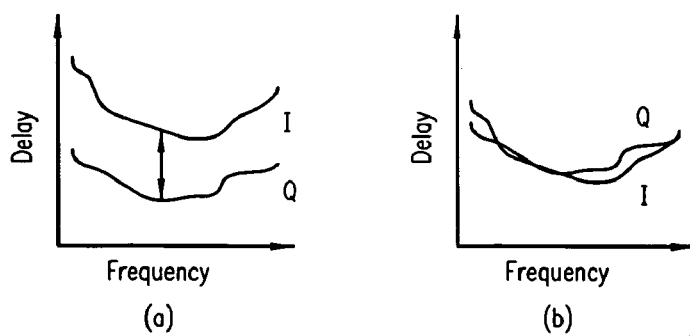
FIG. 3 is a graphical representation of the effect of minimizing the bulk time delay, or mean frequency delay, between the two (IQ) signal paths.

The relative group delay between the in-phase and quadrature signal paths is, therefore, an additional mechanism for the degradation of quadrature modulation. An effective approach to minimizing the relative group delay is to minimize the bulk time delay, or mean frequency delay, between the two signal paths, as shown in FIG. 3. The present invention provides a system and method for minimizing the relative bulk time delay between the in-phase and quadrature signal paths. In a preferred embodiment this is achieved by adapting frequency-flat, fractional-timing interpolation filters in each path.

FIG. 4 is a schematic drawing of a circuit for implementing differential IQ delay compensation in a communications system employing AQM compensation, in accordance with a first embodiment of the present invention. In the preferred embodiment, the signal processing required to estimate the IQ time offset is block processed. In FIG. 4, FWD and OBS may therefore represent data capture buffers of finite length. FIG. 4 shows the relevant forward path 13 and adaptation block 14 circuit blocks employed to compensate for the quadrature timing error. The inputs to the forward path processing block 13 are the in-phase 10 and the quadrature 20 components of the AQM compensated signal from the circuit of FIG. 1. Alternatively, the operation of the circuit of FIG. 1 may be incorporated in the predistorter 106 (FIG. 6) and the predistorted digital signal from predistorter 106 comprises the in-phase 10 and the quadrature 20 components of the input to the forward path processing block 13. The timing offset is achieved by a pair of interpolating FIR filters 11 and 21, which introduce equal and opposite fractional time delays in the I and Q paths, respectively. The delay compensated outputs 12 and 22 can then be further processed, or sent directly to the digital-to-analog converters 110, 112 (FIG. 6).

In the preferred embodiment, the interpolating filters 11 and 21 are frequency-flat, N-tap, finite impulse response filters. The coefficient values are computed by a time-offset sinc function, as described in equation (1) below, where N is the number of coefficients and $\Delta t$ is the relative time delay between the I and Q paths. The time delay introduced is divided equally between the two paths. The number of coefficients is chosen to optimize the pass-band flatness and implementation cost. Additionally, the frequency response can be optimized further by the application of suitable windowing functions to minimize ripple.

$$\text{FIR\_coeffs} = \begin{cases} \frac{\sin(\pi T)}{\pi T} & T \neq 0 \\ 1 & T = 0 \end{cases} \quad (1)$$

$$T = \frac{-(N-1)}{2} \pm \frac{\Delta t}{2} : \frac{(N-1)}{2} \pm \frac{\Delta t}{2}$$

The coefficients of the interpolating filters 11 and 21 are optimized by the adaptation block 14. This block takes as its inputs the in-phase (I) path 10 and quadrature (Q) path 20 components of the forward path signal along with the I and Q path components 30, 40 of the observation signal from the observation path taken from the output of the power amplifier and down converted to baseband as described above (in relation to FIG. 6). It is assumed at this point that the forward path and the observation path signals are time-aligned in terms of the absolute on-time cross correlation of the two signals being maximized, for example, in an implementation employing adaptive predistortion. In the preferred embodiment, no further external timing adaptation occurs until the interpolation filter coefficients have been optimized.

The IQ delay is derived using two delay-locked loops (DLL), serving the in-phase and quadrature paths separately. Each DLL is driven by the error between two cross-correlations of the reference signal 10 or 20 with the observation signal 30 or 40; the two cross-correlations are differentiated by a time-delayed and a time-advanced version of the observation signal.

In the preferred embodiment, the adaptation of the coefficients for the interpolating filters 11 and 21 is done entirely in a digital signal processor. When adaptation is complete, the coefficients of filters 11 and 21 in the forward path are updated. The embodiment of FIG. 4 employs additional interpolating filters 31 and 41 within the digital signal processor, although these need not be as complex as filters 11 and 12 as the passband flatness is less of an issue in this case.

The output of filters 31 and 41 pass into the correlation computation blocks 32 and 42 along with the reference signals 10 and 20. The Early/Late gate cross-correlations for the in-phase path are computed as shown in equation (2) below; the equivalent correlations for the quadrature path are shown in equation (3).

$$\hat{E}_{\text{I\_early}} = \sum_{p=1+\text{DLL\_GAP}}^{\text{LEN}-\text{DLL\_GAP}} FWD_I[p] \cdot OBS_I[p + \text{DLL\_GAP}] \quad (2)$$

$$\hat{E}_{\text{I\_late}} = \sum_{p=1+\text{DLL\_GAP}}^{\text{LEN}-\text{DLL\_GAP}} FWD_I[p] \cdot OBS_I[p - \text{DLL\_GAP}]$$

$$\hat{E}_{\text{Q\_early}} = \sum_{p=1+\text{DLL\_GAP}}^{\text{LEN}-\text{DLL\_GAP}} FWD_Q[p] \cdot OBS_Q[p + \text{DLL\_GAP}] \quad (3)$$

$$\hat{E}_{\text{Q\_late}} = \sum_{p=1+\text{DLL\_GAP}}^{\text{LEN}-\text{DLL\_GAP}} FWD_Q[p] \cdot OBS_Q[p - \text{DLL\_GAP}]$$

The time offset, DLL_GAP, is preferably chosen based on the characteristic of the transmit waveform, where its modulation envelope can limit the central correlation lobe and, hence, the lock-in range. In the preferred embodiment, the offset is two samples.

The timing errors for the two paths are calculated in the Timing Delay Estimate and Average blocks 33 and 43 as shown in equations (4) and (5) below, respectively, where E is the expectation, or average, over the number of data capture buffers accumulated, i.

$$E_I = E\left[\text{DLL\_LOOP\_GAIN} * \left(\frac{\hat{E}_{\text{I\_late}}[i] - \hat{E}_{\text{I\_early}}[i]}{\text{LEN}}\right)\right] \quad (4)$$

$$E_Q = E\left[\text{DLL\_LOOP\_GAIN} * \left(\frac{\hat{E}_{\text{Q\_late}}[i] - \hat{E}_{\text{Q\_early}}[i]}{\text{LEN}}\right)\right] \quad (5)$$

The outputs of the Timing Delay Estimate blocks are the current timing offset errors of each path. Blocks 34 and 44 accumulate these errors and re-calculate the coefficients of the interpolating filters 31 and 41, using equation (1).

The absolute error difference between the two paths is calculated in block (50), which is used as an input to two comparators 65 and 75. Comparator 65 has a maximum error difference threshold set by input 60, and is used to reduce DLL_LOOP_GAIN in equations (4) and (5) as the loops converge, which reduces the variance on the converged result. Comparator 75 is controlled by a lower threshold 70, and determines when the two loops have adequately converged.

The two loops converge not only on the IQ relative delay, but also on the time delay between the reference and observation paths, if any remains after the main timing algorithm has been disabled. Only the relative time delay between the I and Q paths is of importance in the forward path, so to avoid any unnecessary time delay, block 80 removes any common time offset between the two paths before updating the forward-path interpolating filters 11 and 21. This is triggered by the output of comparator 75.

Figure 5:
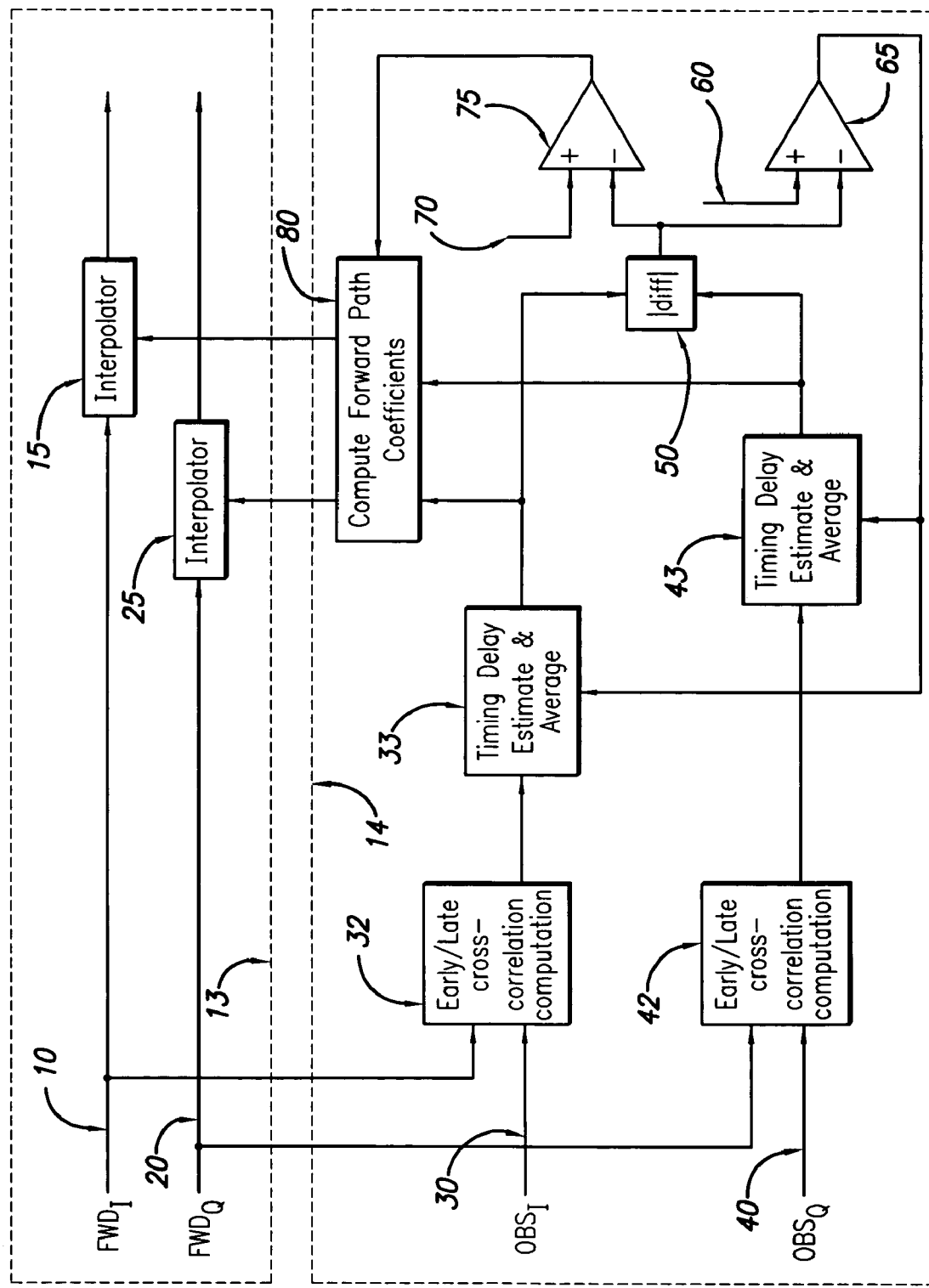
FIG. 5 is a schematic drawing of a circuit for implementing differential IQ delay compensation in a communications system employing AQM compensation, in accordance with a second embodiment of the present invention.

A second embodiment of the present invention is shown in FIG. 5. In the second embodiment, the interpolating filters of FIG. 4 (31 and 41) are removed and the forward path interpolators 15, 25 are modified directly, as shown in FIG. 5. As in the first embodiment, block 80 is employed to remove any common time offset between the I and Q paths before updating the forward path interpolating filters. Comparator 75 is used to disable the update of the forward path interpolators 15 and 25 when the loops have converged.

Although specific detailed embodiments have been described these should not be viewed as limiting in nature as a variety of modifications may be provided employing the teachings of the present invention, as will be appreciated by those skilled in the art.

What is claimed is:

1. A method for compensating for a relative time delay between an in-phase and quadrature signal paths of a communications system utilizing an analog quadrature modulator, wherein the communications system comprises a forward path and an observation path, comprising:
   digitally computing timing errors for the in-phase and quadrature signal paths, comprising:
      computing a timing error for the in-phase signal path from the difference between a cross-correlation of an in-phase part of a forward path signal with a delayed in-phase part of an observation path signal and the cross-correlation of the in-phase part of the forward path signal with an advanced in-phase part of the observation path signal, and
      computing a timing error for the quadrature signal path from the difference between a cross-correlation of a quadrature part of a forward path signal with a delayed quadrature part of the observation path signal and the cross-correlation of the quadrature part of the forward path signal with an advanced quadrature part of the observation path signal; and
   adjusting one or both of the forward path in-phase and quadrature signal paths to remove the relative time delay between the in-phase and quadrature signal paths.

2. A method for compensating for the relative time delay between the in-phase and quadrature signal paths of the communications system as set out in claim 1, wherein adjusting one or both of the forward path in-phase and quadrature signal paths comprises modifying the coefficients of interpolating filters in the forward path.

3. A method for compensating for the relative time delay between the in-phase and quadrature signal paths of the communications system as set out in claim 1, further comprising accumulating the in-phase timing error and wherein adjusting one or both of the forward path in-phase and quadrature signal paths to remove the relative time delay comprises using the accumulated in-phase timing error to modify the coefficients of an interpolating filter on the in-phase part of the forward path.

4. A method for compensating for the relative time delay between the in-phase and quadrature signal paths of the communications system as set out in claim 1, further comprising accumulating the quadrature timing error and wherein adjusting one or both of the forward path in-phase and quadrature signal paths to remove the relative time delay comprises using the accumulated quadrature timing error to modify coefficients of an interpolating filter on the quadrature part of the forward path.

5. A method for compensating for a relative time delay between an in-phase and quadrature signal paths of a digitally modulated transmitter, comprising:
   receiving in-phase and quadrature digital signals from a forward path and an observation path of the transmitter;
   digitally computing an in-phase timing error employing a cross-correlation between the forward path and the observation path in-phase digital signals;
   digitally computing a quadrature timing error employing a cross-correlation between the forward path and the observation path quadrature digital signals;
   determining the absolute difference between the in-phase and quadrature timing errors;

correcting the relative time delay between the in-phase and quadrature digital signals in the forward path employing said in-phase timing error and said quadrature timing error, the correcting having an associated loop gain; and employing the absolute difference between the in-phase and quadrature timing errors to modify the loop gain of the correcting in the forward path.

6. A method for compensating for the relative time delay between the in-phase and quadrature signal paths of the digitally modulated transmitter as set out in claim 5, wherein correcting the relative time delay between the in-phase and quadrature digital signals in the forward path comprises calculating coefficients from said in-phase and quadrature timing errors and modifying the coefficients of interpolating filters in the forward path employing the coefficients calculated from said in-phase and quadrature timing errors.

7. A method for compensating for the relative time delay between the in-phase and quadrature signal paths of digitally modulated transmitter as set out in claim 6, wherein the interpolating filters introduce fractional delays in the in-phase and quadrature signal paths.

8. A method for compensating for the relative time delay between the in-phase and quadrature signal paths of the the digitally modulated transmitter as set out in claim 6, wherein the coefficients are computed by a time offset sinc function.

9. A method for compensating for the relative time delay between the in-phase and quadrature signal paths of the digitally modulated transmitter as set out in claim 5, wherein the relative time delay between the in-phase and quadrature digital signals is divided equally in correcting the in-phase and quadrature forward signal paths.

10. A method for compensating for the relative time delay between the in-phase and quadrature signal paths of the digitally modulated transmitter as set out in claim 5, wherein computing said cross-correlations comprises computing the cross-correlation of the in-phase and quadrature forward path signals with advanced and delayed in-phase and quadrature observation path signals.

11. A method for compensating for the relative time delay between the in-phase and quadrature signal paths of the digitally modulated transmitter as set out in claim 10, further comprising interpolating said observation path signals prior to computing said cross-correlations.

12. A system for compensating for a relative time delay between an in-phase and quadrature signal paths of a communications system, comprising:
a forward path input for receiving digital in-phase and quadrature forward path signals;
in-phase and quadrature interpolation circuits coupled to the forward path input and receiving and time adjusting the digital in-phase and quadrature forward path signals, respectively, employing interpolating coefficients; and an adaptation circuit block, coupled to the forward path input and having an observation path input for receiving digital in-phase and quadrature observation path signals corresponding to a sampled output of the communications system, for receiving the digital in-phase and quadrature forward and observation path signals and computing said interpolating coefficients from said digital in-phase and quadrature forward and observation path signals and providing the interpolating coefficients to said in-phase and quadrature interpolation, circuits to compensate for the relative time delay between the in-phase and quadrature signal paths, wherein said adaptation circuit block comprises an in-phase cross-correlation calculation circuit block receiving the digital in-phase forward and observation path signals and performing in-phase cross-correlation calculations thereon, a quadrature cross-correlation calculation circuit block receiving the digital quadrature forward and observation path signals and performing quadrature cross-correlation calculations thereon, and a coefficient computation circuit block coupled to receive the output of said in-phase and quadrature cross-correlation calculation circuit blocks.

13. A system for compensating for the relative time delay between the in-phase and quadrature signal paths of the communications system as set out in claim 12, wherein said in-phase and quadrature interpolation circuits comprise finite impulse response filters and said interpolating coefficients comprise filter coefficients.

14. A system for compensating for the relative time delay between the in-phase and quadrature signal paths of the communications system as set out in claim 13, wherein the finite impulse response filters introduce equal and opposite fractional time delays in the digital in-phase and quadrature forward path signals.

15. A system for compensating for the relative time delay between the in-phase and quadrature signal paths of the communications system as set out in claim 12, wherein said adaptation circuit block further comprises in-phase and quadrature fractional interpolating filters coupled between said observation path input and said in-phase and quadrature cross-correlation calculation circuit blocks.

16. A system for compensating for the relative time delay between the in-phase and quadrature signal paths of the communications system as set out in claim 12, wherein said adaptation circuit block comprises in-phase and quadrature delay locked loops drive by the error in cross-correlations between the digital in-phase and quadrature forward and observation path signals.

* * * * *